(12) United States Patent
Irazusta et al.

(10) Patent No.: US 12,543,944 B2
(45) Date of Patent: Feb. 10, 2026

(54) VISUAL ACUITY DETERMINATION

(71) Applicant: Indizen Optical Technologies of America, LLC, Torrance, CA (US)

(72) Inventors: Claudia Irazusta, Madrid (ES); Eduardo Pascual, Madrid (ES); José Alonso Fernández, Madrid (ES)

(73) Assignee: Indizen Optical Technologies of America, LLC, Torrance, CA (US)

( * ) Notice: Subject to any disclaimer, the term of this patent is extended or adjusted under 35 U.S.C. 154(b) by 1044 days.

(21) Appl. No.: 17/520,458

(22) Filed: Nov. 5, 2021

(65) Prior Publication Data

US 2023/0145888 A1 May 11, 2023

(51) Int. Cl.
| | |
|---|---|
| *A61B 3/02* | (2006.01) |
| *A61B 3/00* | (2006.01) |
| *A61B 3/032* | (2006.01) |
| *A61B 3/04* | (2006.01) |
| *A61B 3/10* | (2006.01) |
| *A61B 3/12* | (2006.01) |
| *G02C 7/02* | (2006.01) |
| *G06N 3/045* | (2023.01) |

(52) U.S. Cl.
CPC ............ *A61B 3/0025* (2013.01); *A61B 3/032* (2013.01); *A61B 3/04* (2013.01); *A61B 3/1015* (2013.01); *G02C 7/027* (2013.01); *G06N 3/045* (2023.01)

(58) Field of Classification Search
CPC ......... A61B 3/02; A61B 3/102; A61B 3/1025; A61B 3/113; A61B 3/1015; A61B 3/1225; A61B 3/024; A61B 3/032

USPC .............. 351/239, 200, 205, 206, 209, 210, 351/221–223, 240–243, 246
See application file for complete search history.

(56) References Cited

U.S. PATENT DOCUMENTS

| | | | |
|---|---|---|---|
| 7,360,894 B2* | 4/2008 | Hirohara | A61B 3/1015 351/205 |
| 2012/0002165 A1* | 1/2012 | Saito | A61B 3/14 356/72 |
| 2019/0086690 A1* | 3/2019 | Fernández | G02C 7/025 |

(Continued)

FOREIGN PATENT DOCUMENTS

WO  WO-2004079637 A1 *  9/2004  ............... G06K 9/52

*Primary Examiner* — Dawayne Pinkney
(74) *Attorney, Agent, or Firm* — SoCal IP Law Group LLP; Angelo J. Gaz; Mark A. Goldstein

(57) ABSTRACT

Systems and methods for visual acuity calculation including consideration of a combination of ocular aberrations and lens aberrations are disclosed. One method includes obtaining ocular aberration data and introducing a correction in the defocus term of the ocular aberration data to account for longitudinal chromatic aberration. Lens aberration data is obtained, including performing raytracing through the ophthalmic lens of the patient. Correction to tilt and defocus terms of the lens aberration data is made to account for transverse and longitudinal chromatic aberrations. Polychromatic Point Spread Functions (PSFs) associated to the ocular aberration data and lens aberration data are used to generate retinal images. Retinal sampling is applied to the retinal images, followed by filtering and normalizing the retinal images is also performed. Finally, a maximum visual acuity value is determined. The methods are performed using one or more computing devices.

8 Claims, 9 Drawing Sheets
(2 of 9 Drawing Sheet(s) Filed in Color)

(56) References Cited

U.S. PATENT DOCUMENTS

2019/0137758 A1\* 5/2019 Banks .................. H04N 13/344
2021/0093180 A1\* 4/2021 Hall ....................... G09B 23/30

\* cited by examiner

VISUAL ACUITY DETERMINATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to evaluating the visual acuity of a lens wearer.

Description of the Related Art

Visual acuity is the standard and most widely used metric for assessing visual performance of individuals. Subjective techniques are still the preferred methods for accurate evaluation of an individual's visual acuity. The most common of these techniques is the Snellen chart test. This test requires an optometrist to show the patient a set of letters or optotypes in increasingly smaller sizes at a fixed distance under particular illumination conditions. The minimum size for which the subject is able to adequately identify a certain number of optotypes determines the individual's visual acuity. This is a well settled method for visual acuity determination capable of providing accurate and reliable results in many individuals. However, this test relies on the availability of a clinician to conduct the test and the individual to participate in it. The effectiveness of the test is dependent on a variety of factors, such as contrast between optotypes and background or the particular illumination conditions under which the test is conducted. Moreover, the result of the measurement depends on subjective factors that impact the sensitivity of the individual to blur, such as visual fatigue and degree of concentration. Also, the result depends on the ability of the individual to extract information from blurred images, which in turn depends on the fatigue of the individual. Consistency of test results is problematic and impacts the repeatability of the test results. Repeatability, however, is not the only limitation of this technique— accuracy may be affected by uncorrected refractive errors presented by the individual. Plus, the reliability of the test is diminished when testing children.

An objective, simple and time-efficient method of assessing visual acuity is thus of immeasurable value to the ophthalmic sector. With the advent of rapid and accurate aberrometry techniques, clinicians are now able to characterize the aberrations that affect patients' eyes with relative ease. The magnitude of these aberrations is directly linked to the patient's visual performance and thus constitutes an objective source of information for visual acuity determination. Deriving the visual acuity of a patient from aberrometry data, however, is a complex and tedious procedure. There is not enough understanding of the ocular system to accurately model this relationship.

Previous research refers to models of visual acuity using only aberration measurements of the naked eye. This, however, is not realistic. Research has shown that certain combinations of aberrations interact with each other to provide superior or degraded vision, leading to strongly nonlinear relations between visual acuity and aberration coefficients. Therefore, patients wearing spectacle lenses may experience a certain boost or degradation in their visual quality consequent from their ocular aberrations interacting with the aberrations introduced by the lenses for each gaze direction. For this reason, modeling the visual acuity of the combination of both ocular and lens aberrations is fundamental to properly characterize the visual quality experienced by the individual when wearing glasses.

Further, current models of visual acuity limited to ocular aberrations cannot properly assess the impact of transverse chromatic aberrations on visual quality. One researcher has proposed that longitudinal chromatic aberration of the eye can be taken into account by introducing a certain correction in the defocus term of the ocular aberrations. Transverse chromatic aberration, however, cannot be measured by objective aberrometers, and neither is it present in the foveal image of a naked eye used for visual acuity calculations. However, patients experience transverse chromatic aberration when gazing at oblique directions of sight while using spectacle lenses, and, therefore, the impact of such aberration on visual performance should not be neglected.

DESCRIPTION OF THE DRAWINGS

The patent or application file contains at least one drawing executed in color. Copies of this patent or patent application publication with color drawing(s) will be provided by the Office upon request and payment of the necessary fee.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Described herein is a method that provides a more accurate, improved and more repeatable visual acuity evaluation resulting from inclusion of the combination of both eye and lens aberrations. As used herein, the term "aberrations" refers to systematic defects that affect an individual's visual acuity, including those stemming from ophthalmic lenses and the human eye, and cause light from an object point to be spread out over some region of space rather than focused at a distinct image point. The method includes creating an objective visual acuity model associated with the combination of ocular and lens wavefront aberrations both for monochromatic and polychromatic light, including the transverse chromatic aberration introduced by the lens. A statistical model for visual acuity calculation associated with the combination of ocular and lens wavefront aberrations is trained with visual acuity values simulated with the objective model.

Figure 1:
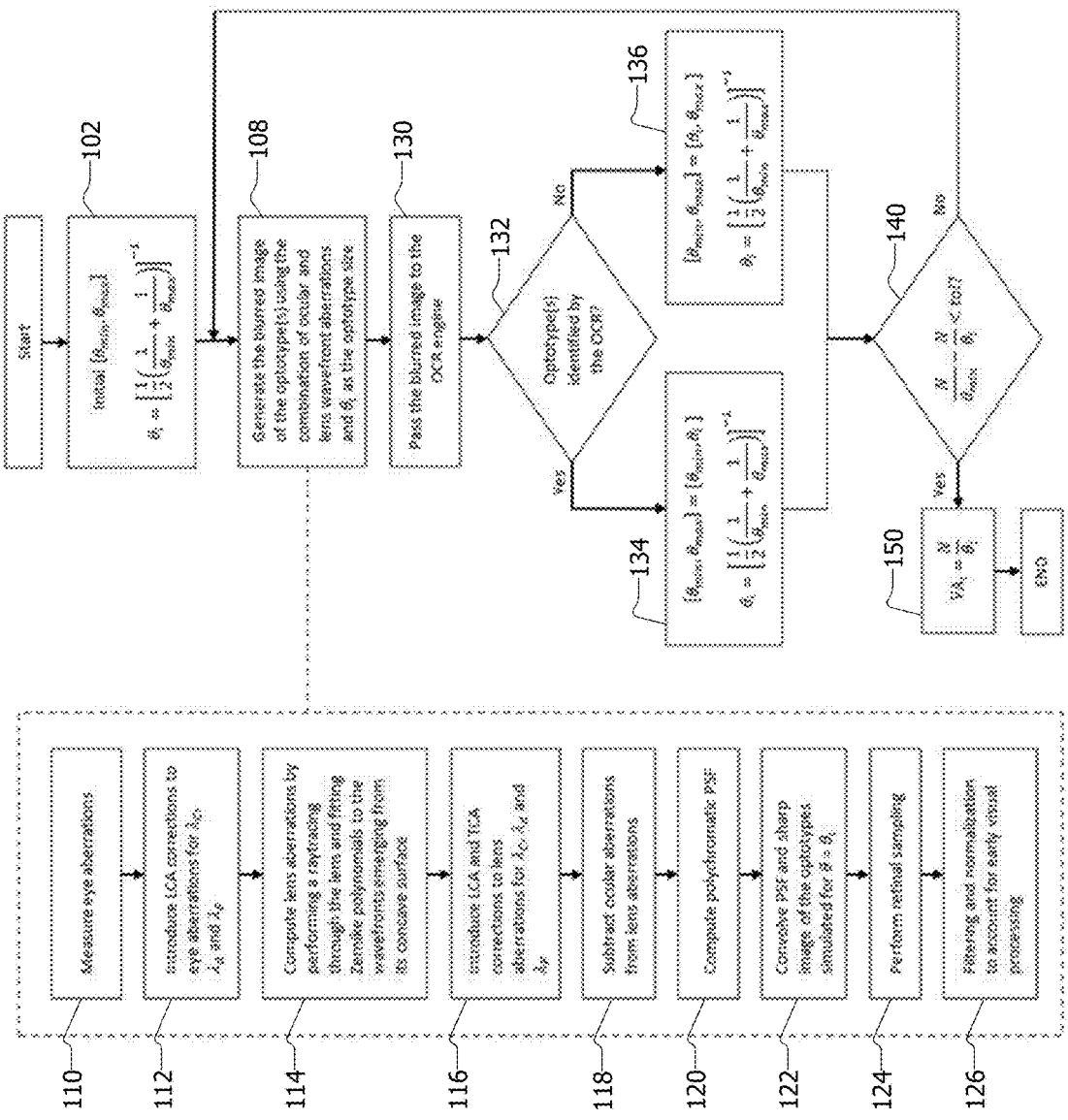
FIG. 1 is a flow chart of a detailed, improved method for visual acuity calculation incorporating ocular and lens aberrations.

Referring now to FIG. 1, a flow chart of a detailed, improved method for visual acuity calculation incorporating ocular and lens aberrations is shown. This method is referred to herein as the optical character recognition or OCR method.

The flow of actions begins with an initial interval [$\theta_{min}$, $\theta_{max}$] for the optotype size, as shown in block 102. The optotype interval size is chosen. In one embodiment, this interval ranges from 2.5 arcmin to 1000 arcmin. The initial size $\theta_i$ of the optotypes considered for the simulation is computed as:

$$\theta_i = \left[\frac{1}{2}\left(\frac{1}{\theta_{min}} + \frac{1}{\theta_{max}}\right)\right]^{-1}.$$

The core of the method then begins.

1. Ocular and Lens Aberrations

According to this method, first, the combination of the ocular and lens aberrations is computed to generate the blurred image of an optotype using Bi as the optotype size, as shown in block 108. This is achieved using the method shown and described regarding blocks 110 through 126 of FIG. 1.

Measuring Eye Aberrations

Eye aberrations are measured, as shown in block 110. Eye (ocular) aberrations may be measured with any commercially available aberrometer, wavefront sensor or apparatus capable of measuring a set of Zernike coefficients describing the aberrations of the individual's eye. As stated above, the transverse chromatic aberration (TCA) of the eye is not measurable and is not relevant for visual acuity models. Longitudinal chromatic aberration (LCA), on the other hand, is measurable and must be considered. Chromatic aberrations affect all optical instruments, such as ophthalmic lenses, or the human eye, and arise from the wavelength dependency of the refractive index. LCA is responsible for the shift in focus experienced by a lens for different wavelengths. As LCA is a wavelength-dependent defocus, LCA corrections are introduced to eye aberrations for $\lambda_C$, $\lambda_d$ and $\lambda_F$, as shown in block 112. To consider LCA, the introduction of a correction in the defocus term $c_4$ of the Zernike coefficients is included. In one implementation, this correction is computed as follows:

$$\Delta c_4 = -\frac{D(\lambda)R^2}{4\sqrt{3}} \to c_4 = c_4 + \Delta c_4$$

where R is the eye pupil and $D(\lambda)$ is the LCA associated to a certain wavelength $\lambda$, measured in diopters. Because aberrometers operate with only one or two wavelengths, it is not possible to measure $D(\lambda)$, and, instead, its value is estimated for different wavelengths based on statistical values of longitudinal chromatic aberration among a population (or group of individuals) or through mathematical computations using a reduced-eye model. In one implementation, the amount of LCA affecting the eye is approximated by the following expression:

$$D(\lambda) = -21.587 + 92.87\lambda - 134.98\lambda^2 + 67.407\lambda^3$$

where $\lambda$ is measured in microns and $D(\lambda)$ is measured in diopters. The correction to the defocus Zernike coefficient is computed for the tree wavelengths associated to the spectral lines C, d and F ($\lambda_C$=656.3 nm, $\lambda_d$=587.6 nm and $\lambda_F$=486.1 nm, respectively). Although the method is described with three wavelengths, other spectral lines may be used for visual acuity computation. Despite the method being described considering only wavefronts represented by Zernike polynomials, other sets of polynomials, thin-plate splines, radial functions, etc. may be incorporated in the method in place of Zernike polynomials.

Computing Lens Aberrations

Lens aberrations are derived from mathematical calculations that involve simulating the optical system, performing a ray tracing through the lens, and fitting Zernike (or other) polynomials to the wavefronts emerging from the concave surface of the lens, as shown in block 114. In an example implementation, the aberrations of the lenses are expressed in terms of the Zernike polynomial coefficients calculated as follows:

a. The optical system is traced with an array of ray pencils. Each ray pencil consists of a chief ray and a plurality of secondary rays. In one embodiment, there are 90 secondary rays forming a spiral around each chief ray with radius equal to the individual's pupil.

b. Each refracted ray pencil exiting the optical system at the pupil's plane defines a wavefront, the surface that results from propagating each secondary ray of the pencil the necessary distance to match the chief ray's phase.

c. A set of Zernike polynomials is fitted to each of these wavefronts using the eye pupil as the normalization parameter. The coefficients of the fitting describe the monochromatic aberrations of the optical system under evaluation.

d. To account for the chromatic aberrations of the lens, the above actions recited in the prior three paragraphs are repeated for the three wavelengths associated to the spectral lines C, d and F, and a set of corrections to the Zernike coefficients is derived for each direction of sight and wavelength. These corrections arise from the fact that the refractive index of the lens is wavelength dependent. Because lenses are generally calculated and optimized using the refractive index of the spectral line d, the aberration coefficients associated to this wavelength are free of chromatic aberration correction.

LCA introduces differences between the defocus coefficients computed for each wavelength and direction of sight. Transverse chromatic aberration or TCA, on the other hand, affects light inciding obliquely on the lens by producing a different deviation or prismatic effect when traced considering wavelengths other than the central $\lambda_d$. LCA and TCA corrections are introduced to lens aberrations for wavelengths $\lambda_C$, $\lambda_d$ and $\lambda_F$, as shown in block 116. As stated previously, LCA will be accounted for by modifying the defocus coefficients computed for each wavelength and direction of sight. The method accounts as well for the TCA associated to the spectral lines C and F by adding a certain amount of tilt in the X and Y directions to the Zernike coefficients $c_1$ and $c_2$ of the lens aberrations, respectively. Calculation of these terms is performed with the following procedure:

i. Because chief rays traced for the central wavelength $\lambda_d$ do not experience any TCA, their direction after emerging from the concave surface of the lens is considered the "reference direction" $k=(k_x, k_y, k_z)$.

ii. Chief rays emerging from the concave surface of the lens for the C and F spectral lines will be translated to the reference system of k. The direction of the reference ray in its own reference system is (0,0,1).

iii. The X and Y components of the 3D vector describing the direction of the rays associated to the two spectral lines in the new reference system will be the values of the Zernike coefficients $c_1$ and $c_2$, respectively. Note that the pencil is thin in relation to its focal distance, and thus the Z component of the direction vector in the new reference system will be approximately 1.

The combination of the eye and lens aberrations is computed for each of the wavelengths by subtracting the Zernike coefficients of the ocular aberrations from lens aberrations, as shown in block 118, according to:

$$c_j(x_i,y_i,\lambda)=c_j^{lens}(x_i,y_i,\lambda)-c_j^{eye}(x_i,y_i,\lambda)$$

where $x_i$ and $y_i$ represent the x and y pupil plane coordinates of the i-th direction of sight, $c_j^{lens}(x_i, y_i, \lambda)$ and $c_j^{eye}(x_i, y_i, \lambda)$ are the lens and eye j-th aberration coefficients associated to i-th direction of sight and wavelength $\lambda$ and $c_j(x_i, y_i, \lambda)$ is their combination.

2. Generating the Retinal Image

To generate the retinal image associated to the combination of aberrations considered above, a Point Spread Function (PSF) is used. The PSF describes the spatial variation of the intensity of the image received at the image plane when the imaging system is illuminated by a perfect point source. The combination of diffraction and aberrations that may affect the optical system results in the image of a perfect point being a blurred spot spreading over a finite area of the image plane. The Point Spread Function serves as a metric for the image quality of optical systems. Here, the polychromatic PSF for the spectral lines is computed, as shown in block 120. The PSF for the spectral lines C, d and F is computed with the following procedure:

a. The complex pupil function P associated to the C, d and F wavelengths is calculated with this expression:

$$P(x_i, y_i, \lambda) = T(x_i, y_i)e^{\frac{2\pi i}{\lambda}W(x_i-s_i(\lambda),y_i-t_i(\lambda),\lambda)}$$

where $T(x_i, y_i)$ is the pupil transmission, $\lambda$ is the wavelength of light, $W(x_i, y_i, \lambda)$ is the wave aberration, and $s_i(\lambda)$ and $t_i(\lambda)$ are decentering factors occurring as a consequence of the TCA and given by $$(s_i(\lambda),t_i(\lambda))=d_i(k_x,k_y)_\lambda,$$

where, $d_i$ is the distance from the back surface of the lens to the corneal vertex along the chief ray i, and $(k_x, k_y)_\lambda$ are the first two components of the direction vectors of the chief ray for wavelength $\lambda$.

In one embodiment, pupil transmission is described by a Gaussian apodization function which models the Stiles-Crawford effect (SCE):

$$T(x_i,y_i)=\eta(\sqrt{x_i^2+y_i^2})\cdot circ(\sqrt{x_i^2+y_i^2},R), R \leq R_P$$

where R is the pupil radius used for $T(x_i, y_i)$ computation, $R_P$ is the pupil radius of the eye, circ is the circular function $$circ(r, R) = \begin{cases} 1, & r \leq R \\ 0 & r > R \end{cases},$$

and $\eta$ is the Stiles-Crawford effect, given by the following expression:

$$\eta(r)=\eta(r_0)10^{-p(\lambda)(r-r_0)^2}$$

where r is the radial coordinate in the pupil plane, $r_0$ is the value of r for which the Stiles' curves is maximum and $p(\lambda)$ is a wavelength dependent function that typically ranges from 0.05 to 0.08. Because SCE varies among individuals, the visual acuity model will take as inputs the SCE parameters of each specific subject or alternatively a standard SCE in the cases where that information is not readily available.

Wavefront aberration $W(x_i, y_i, \lambda)$ is computed using Zernike polynomials up to the fourth radial order according to the OSA standard:

$$W(x_i,y_i,\lambda) = \sum_{j=1}^{14}c_j(x_i, y_i, \lambda)Z_j\left(\frac{x_i}{R_P}, \frac{y_i}{R_P}\right)$$

where $c_j(x_i, y_i, \lambda)$ are the aberration coefficients associated to i-th direction of sight and wavelength $\lambda$. As Zernike Polynomials form a complete basis on a unit circle, the pupil radius R is introduced to normalize the aberration coefficients. The summation in the previous equation starts at j=1 instead of j=0 because the piston term of the Zernike polynomial is omitted.

b. Next, the PSF of the system for each gaze direction and wavelength is calculated with the following equation:

$$PSF(x_i', y_i', \lambda) = \left|\frac{1}{R_P^2}\int\int_{x_i^2+y_i^2 \leq R_P^2} P(x_i, y_i, \lambda)e^{-\frac{2\pi i}{\lambda R_P f'}(x_i' x_i + y_i' y_i)}dxdy\right|^2$$

where $x_i'$ and $y_i'$ are the retinal image plane coordinates and f' is the mean focal length of the human eye.

c. As a result of the calculation in b., there will be three different PSFs associated to the spectral lines C, d and F for each direction of sight. The PSFs associated to the C and F spectral lines are slightly displaced with respect to the PSF of the central wavelength as a result of the TCA.

The human eyes and their combination with spectacle lenses are incoherent optical systems, as such, the method treats the imaging process as a linear system in intensity. Taking this into account, the polychromatic PSF is computed (see block 120) as a sum of the individual PSFs associated to different wavelengths weighted by the spectral sensitivity function $V(\lambda)$ of the human eye for photopic vision and the relative spectral power distribution $D(\lambda)$ of the illuminant considered for the calculations:

$$PSF_{Polychromatic}(x_i', y_i') =$$

$$\sum_{\lambda=0}^{\lambda=\infty} V(\lambda)D(\lambda)PFS(x_i', y_i', \lambda) \approx \approx V(\lambda_C)D(\lambda_C)PSF(x_i', y_i', \lambda_C) +$$

$$V(\lambda_d)D(\lambda_d)PSF(x_i', y_i', \lambda_d) + V(\lambda_F)D(\lambda_F)PSF(x_i', y_i', \lambda_F)$$

3. Generating A Bitmap of a Sharp Image

Figure 2:
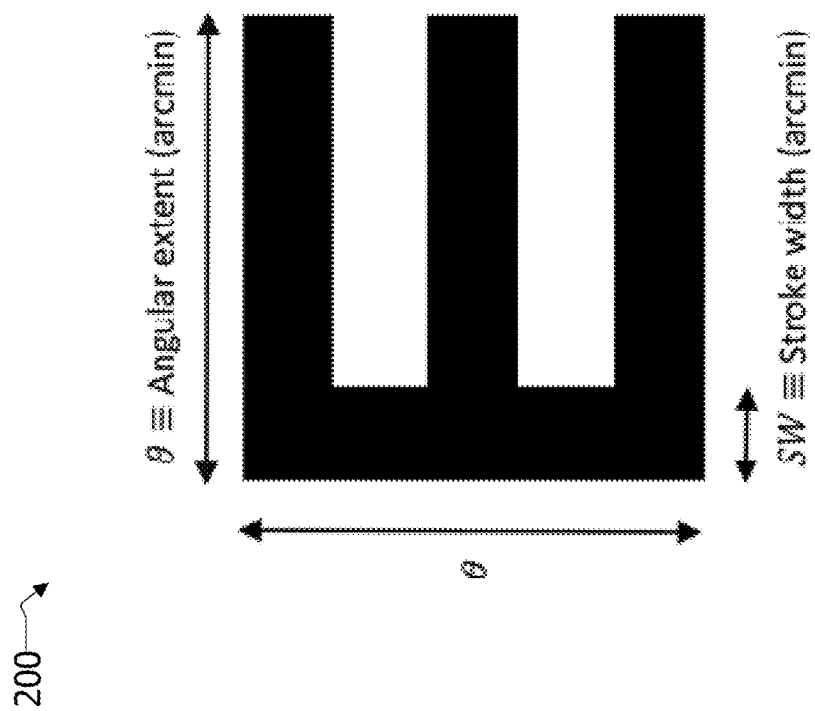
FIG. 2 is a drawing of an example sharp bitmap of the letter "E" optotype.

The bitmap of a sharp optotype or combination of optotypes is generated using an adequate font type and having a certain selected angular extent θ measured in arcmin (1 minute of arc=1/60 of a degree). Referring now to FIG. 2, a schematic drawing of a sharp bitmap of the "E" optotype 200 is shown. The optotype has angular extent θ and stroke width SW.

4. Convolving the PSF and Sharp Image

Figure 3:
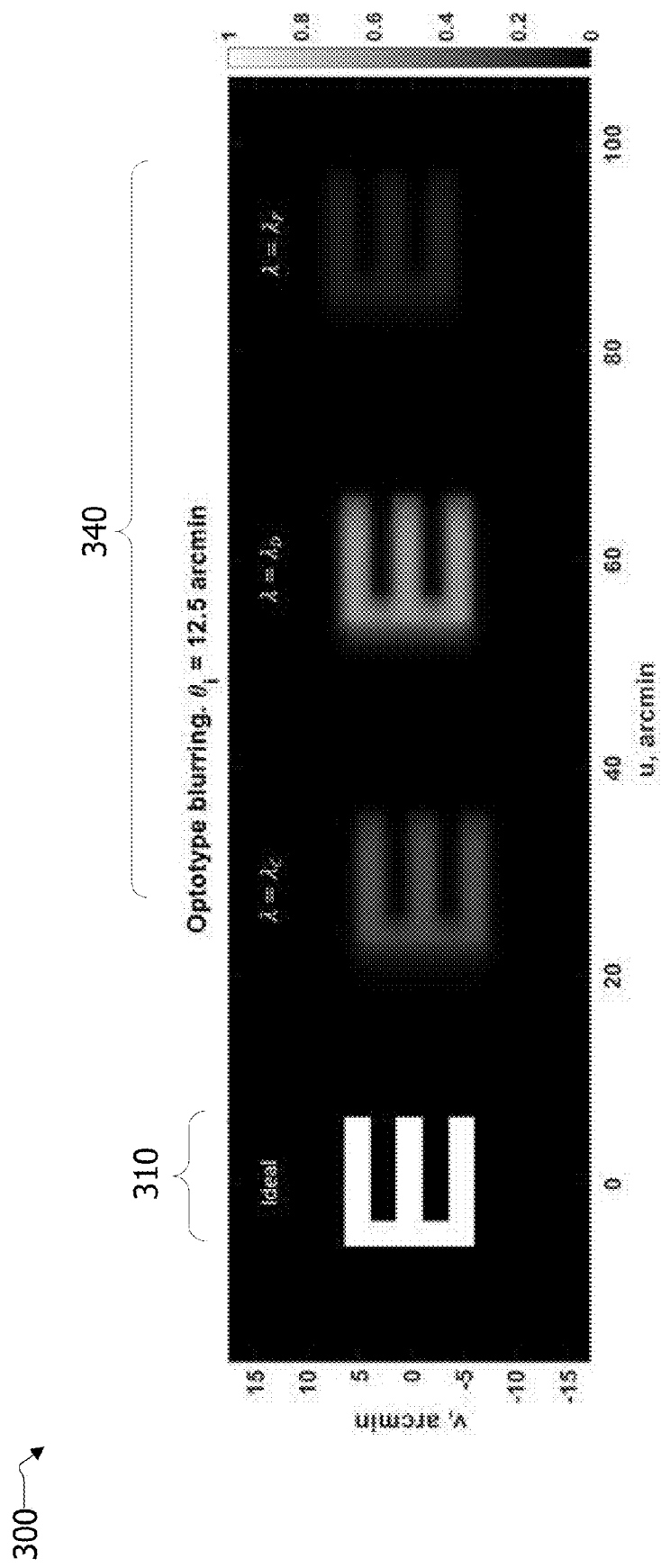
FIG. 3 is a drawing showing an example convolution of the letter "E" optotype.
Figure 4:
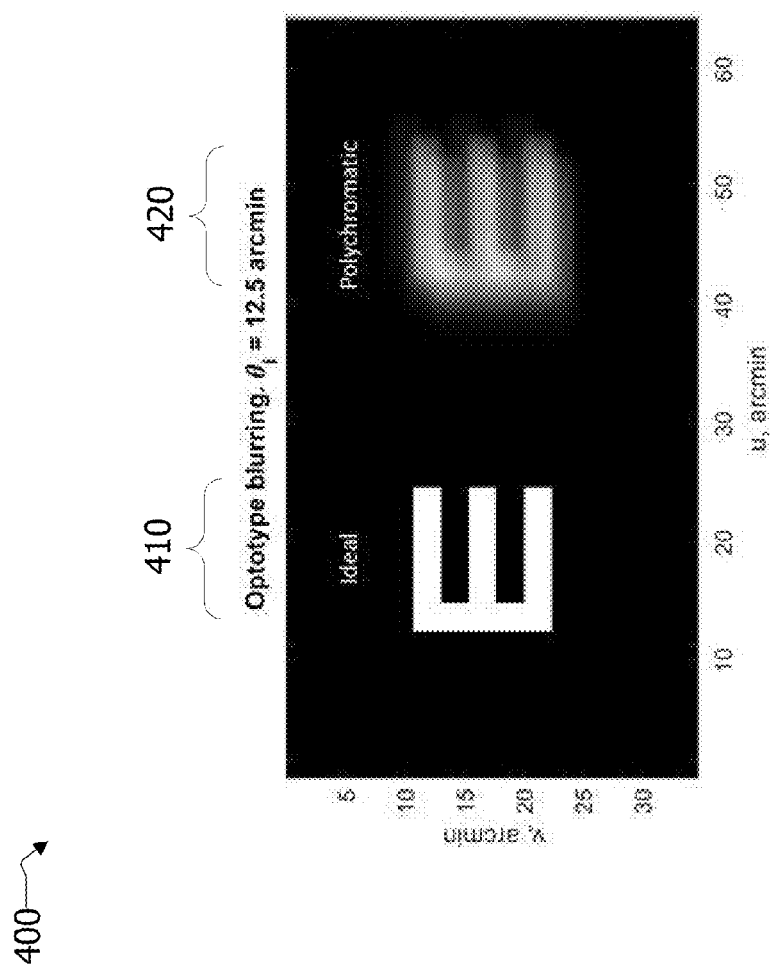
FIG. 4 is a drawing of an example convolution of the letter "E" optotype showing the sharp ideal and polychromatic blurred result.

Referring again to FIG. 1, in block 122 the sharp image of the optotype(s) is convolved with the polychromatic PSF to generate the retinal image. The result is a blurred image of the original optotype or collection of optotypes. The amount of distortion exhibited by the image depends on the magnitude of the aberrations and the angular extent of the optotype used in the previous step—bigger optotypes are less affected by aberrations than smaller optotypes. Referring now to FIG. 3, a drawing of an example convolution 300 of the letter "E" optotype is shown. This drawing shows the sharp bitmap (310) of the "E" optotype (left), and the blurred image (340) generated after its convolution with the PSF associated to the spectral lines C, d and F. In this example, each of the PSFs has been weighted by $V(\lambda)$ and the $D(\lambda)$ associated to the $D_{65}$ illuminant. Referring now to FIG. 4, a drawing of an example convolution 400 of the letter "E" optotype showing the sharp ideal 410 and the blurred image 420 generated after its convolution with the polychromatic PSF. In the examples shown in FIGS. 3 and 4, the convolution was performed considering 0.20 μm of spherical defocus, 0.10 μm of vertical astigmatism, 0.040 μm of horizontal coma, a pupil radius of 2.7 mm, an angular extent $\theta_i$=12.5 arcmin, and the $D_{65}$ illuminant.

5. Perform Retinal Sampling Simulation

Referring again to FIG. 1, in block 124, the retinal sampling performed by the photoreceptor array of the eye is simulated. In one example implementation, retinal sampling is reproduced assuming that the cones at the center of the fovea are distributed in a hexagonal array with an approximate frequency of 120 cycles/deg.

6. Perform Filtering and Normalization

Referring now to block 126, to account for early visual processing, filtering and normalization are performed. Based on a simplified schematic model of early visual processing, the retinal image is subjected to a bank of filters tuned at multiple scales and orientations. The resulting image is intensity-normalized to obtain responses in contrast units. In one example implementation, the filtering may be performed using Gabor filters.

7. Derive the Final Visual Acuity Value

The final visual acuity value $VA_i$ is derived from the minimum stroke width $SW_i$ of the optotype (and consequently the minimum angular extent $\theta_i$) for which the blurred retinal image generated following the previous steps is discernible:

$$VA_i = \frac{1}{SW_i(\text{arcmin})} = \frac{N}{\theta_i(\text{arcmin})}$$

where N is the number of strokes along each dimension of the optotype and $VA_i$ is decimal visual acuity.

In one embodiment, visual acuity is obtained using an optical character recognition (OCR) engine, such as the Tesseract Open-Source OCR Engine. Visual acuity associated to the collection of aberrations considered in 1. the ocular and lens aberrations evaluation (blocks 110 through 116) is determined based on whether the OCR engine recognizes the blurred optotypes from the 6. filtering and normalizing (126) using the following binary search algorithm.

As early described, an initial interval $[\theta_{min}, \theta_{max}]$ for the optotype size is chosen, as shown in block 102. In one embodiment, this interval ranges from 2.5 arcmin to 1000 arcmin. The initial size $\theta_i$ of the optotypes considered for the simulation is computed as:

$$\theta_i = \left[\frac{1}{2}\left(\frac{1}{\theta_{min}} + \frac{1}{\theta_{max}}\right)\right]^{-1}$$

Next, the retinal image of the optotypes affected by a certain collection of aberrations is computed (block 108 and described above regarding blocks 110-126) and passed to the OCR engine for recognition, as shown in block 130.

A check is made to evaluate if the OCR engine can identify the optotype(s), as shown in block 132. If the OCR engine is capable of correctly recognizing the blurred optotypes simulated in block 130, the search algorithm moves to the interval $[\theta_{min}, \theta_i]$, as shown in block 134. If the optotypes are not recognized, the search moves to the interval $[\theta_i, \theta_{max}]$. $\theta_i$, as shown in block 136, and will then recalculate using the new optotype size interval and the expression presented in block 108.

The flow of actions is repeated until the difference Δ given by $$\Delta = \frac{N}{\theta_{min}} - \frac{N}{\theta_i}$$

falls below a certain tolerance, as shown in block 140. In one embodiment, this threshold is 0.01. This may be evaluated as $$\frac{N}{\theta_{min}} - \frac{N}{\theta_i} < tol?$$

as shown in block 140. Finally, the visual acuity is evaluated as $$VA_i = \frac{N}{\theta_i}$$

as shown in block 150.

Figure 5:
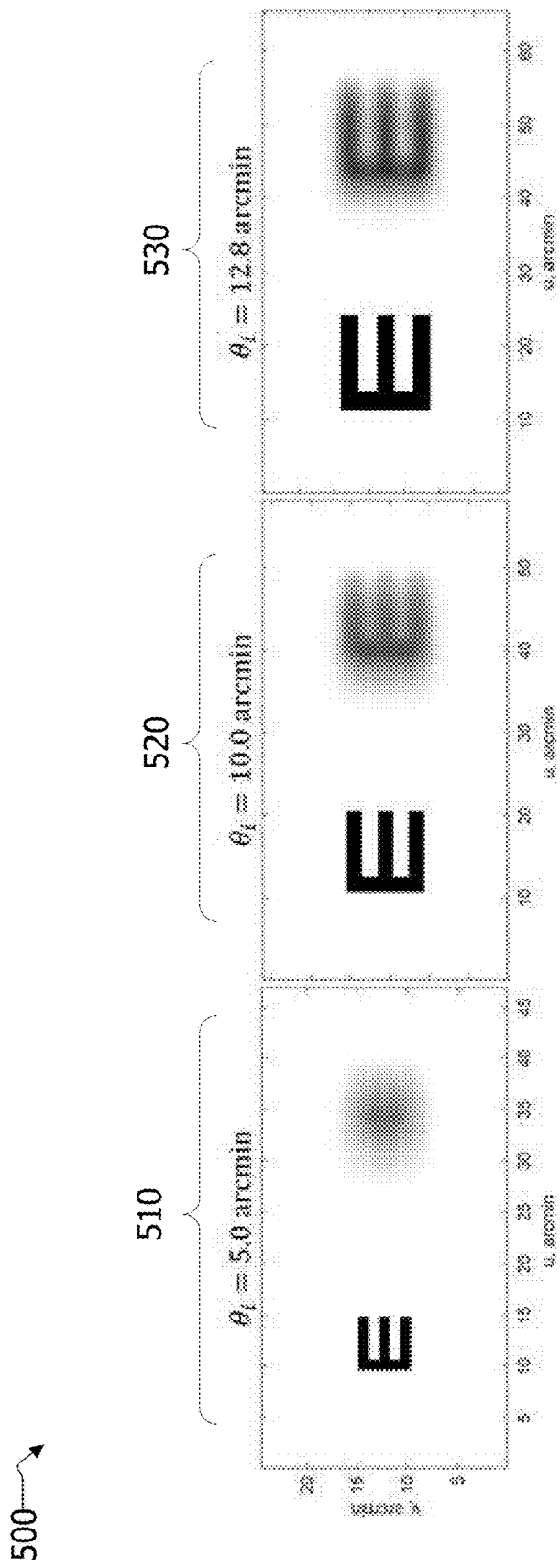
FIG. 5 is a drawing showing the evolution of iterations of an optical character recognition (OCR) engine on an optotype.

Referring now to FIG. 5, the result of iterating through the binary search algorithm with the OCR engine 500 is shown. The sharp optotype is shown paired with the blurred versions. In this example, first (510), second (520) and final (530) iterations of the OCR algorithm are shown with $\theta_i$ at 5.0, 10.0 and 12.8 arcmin, considering 0.35 μm of spherical defocus, 0.10 μm of vertical astigmatism, 0.040 μm of horizontal coma and a pupil radius of 2.7 mm are shown, with a final visual acuity of 0.39.

The visual acuity model presented above in FIG. 1 constitutes an improved, accurate procedure for assessing the visual quality associated to the eye and lens system considering polychromatic light and the transverse chromatic aberration produced by the lens at oblique gaze directions. However, the performance of the entirety of the method shown in FIG. 1 and described above in terms of calculation time renders it impractical for real time evaluation of visual acuity in a clinical setting. Described below is an alternative method of calculating the visual acuity incorporating the combination of eye and lens aberrations for polychromatic light using a statistical model as a way of bypassing the complexity of simulating all the steps involved in the formation and processing of neural images described above. The intricacies of the calculation are transferred to the training process of the model, providing a way of computing visual acuity efficiently in real time. The method described below provides reduced calculation time and improved versatility of use making it valuable in a clinical setting.

The Statistical Model Method

This improved, new method uses a statistical model to predict visual acuity.

Input Parameters

The statistical model takes as input parameters or features the combination of aberration data of both the lens and eye, the eye pupil and the characteristics of the neural response of each particular patient, as well as other parameters that may affect the visual performance of the subject or optical system under study. In one embodiment, input data is or includes: low order aberrations (defocus and oblique and vertical astigmatism); high order aberrations, including but not limited to horizontal and vertical coma, horizontal and vertical trefoil and spherical aberration; chromatic aberrations; pupil radius; and a set of parameters describing the characteristics of the neural response of the patient. When the neural response data or the density of cone receptors in the fovea of the patient are not readily available, common or standard parameters may be used instead, such as those obtained with the equations presented above in para. [0038] and information from para. [0048]

Training Data

The training data set is a collection of examples of the input features for which the corresponding visual acuity has been obtained using the objective visual acuity model presented above. This data may be based on real eye and lens data and/or may be randomly generated based on statistical analyses of aberrations among the general population or a specific demographic group. The number of combinations of aberrations and their magnitude is of a volume that adequately represents the majority of aberrations that typically affect patients and optical systems. In one embodiment, the visual acuity of the training is obtained using the OCR engine method presented above regarding FIG. 1.

Preprocessing

The method may include preprocessing the training data where input data and/or visual acuity are submitted to a variety of processing steps including but not limited to removing outliers or data that may reduce the accuracy of the statistical model's predictions or the effectiveness of its training; or modifying aberrometry data and/or visual acuity values by ways of scaling, normalization, filtering, noise addition or any other procedure or transformation that may increase training effectiveness or accuracy of the statistical model.

Preprocessing for Dimensionality Reduction

A preprocessing of the training data to achieve a dimensionality reduction may be implemented to increase the training efficiency. This preprocessing exploits interactions and symmetries between the aberration coefficients. Because certain combinations of aberrations can interact with each other and lead to unexpected visual acuity values, in this preprocessing the number of input variables of the statistical model are reduced to devise a new set of input parameters computed as a linear combination of the original variables. The dimensionality reduction is performed using principal component analysis (PCA) and/or other procedures capable of simplifying the statistical model and increase the time efficiency of its training. In one embodiment, second order aberrations may be combined in a single parameter, the equivalent blur, computed as:

$$\text{Blur}^2 = P_x^2 + P_y^2 + 2P_t^2 = \frac{48}{R^4}[2(c_3)^2 + (c_4)^2 + (c_5)^2]$$

where R is the pupil diameter and $P_x$, $P_y$ and $P_t$ are the components of the dioptric power matrix associated to the wavefront, which in turn can be derived from the Zernike coefficients as follows:

$$\begin{cases} P_x = \frac{2\sqrt{6}}{R^2}(\sqrt{2}\,c_4 + c_5) \\ P_y = \frac{2\sqrt{6}}{R^2}(\sqrt{2}\,c_4 - c_5) \\ P_t = \frac{2\sqrt{6}}{R^2}c_3 \end{cases}$$

Training Set Generation

The training set is generated at least in part using cross-validation techniques including but not limited to the Monte Carlo, k-fold, or "leave-one-out cross-validation" (LOOCV) techniques.

The Neural Network

The statistical model described above is implemented, in one embodiment, as a neural network. This method is referred to herein as the neural network method and has the following characteristics:

1. Kind of Neural Network

The neural network is the regression type. As visual acuity is not a discrete magnitude, the model designed for this purpose is continuous. In one embodiment, the neural network is constructed as a feedforward network.

2. Layers of the Neural Network

In one embodiment, the neural network model is constructed with a multitude of layers, including, but not limited to, one or more input layers, hidden or intermediate layers and output layers. A minimum of one input layer is configured to take as input parameters the aberrometry data of the subject and the lens under study. A minimum of one output layer is configured to obtain the final visual acuity predictions. Hidden layers are configured to perform calculations necessary to derive the intermediate predictions from which visual acuity is obtained. Each of the layers in the neural network model have a particular activation function including but not limited to hyperbolic tangents, sigmoid and linear functions and further include one or more hidden units or neurons.

In an example implementation, the neural network includes: one input layer with an hyperbolic tangent function as activation function and 13 nodes corresponding to 13 input features: pupil radius, astigmatism, defocus, coma, trefoil, quadrafoil, secondary astigmatism and spherical aberrations; 3 hidden layers with the hyperbolic tangent for activation function and 20, 30 and 20 neurons each; and one output layer with a linear activation function and a single node for the final visual acuity computation.

3. Training

In one embodiment, the training process is performed using at least one of a variety of algorithms including, but not limited to, gradient descent, Levenberg-Marquardt, Bayesian regularization or BFGS-Quasi-Newton.

4. Visual Acuity Model

Figure 6:
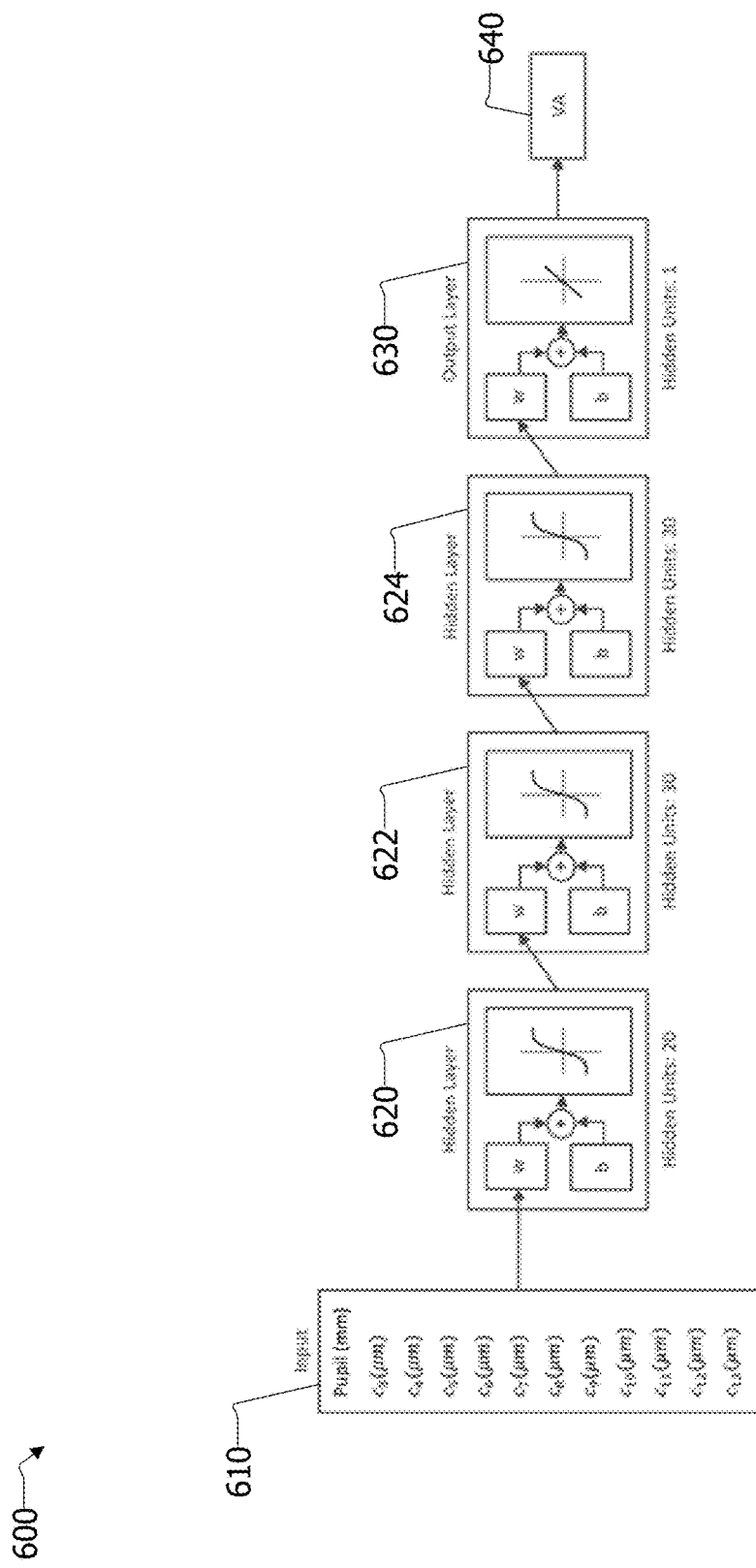
FIG. 6 is a drawing of a neural net of a statistical model for use in deriving a visual acuity measurement.

The resulting visual acuity model includes one or more neural networks incorporating all the previous characteristics. In one example implementation, the visual acuity model has four neural networks trained with different data sets from which the final visual acuity may be computed as the mean value of each network prediction. Referring now to FIG. 6, a drawing showing an example neural network model 600 for visual acuity computation is shown. The neural network includes multiple input features (in one embodiment there are 13 input features) 610 including the pupil radius, astigmatism, defocus, coma, trefoil, quadrafoil, secondary astigmatism and spherical aberrations of the optical system under study; three hidden layers 620, 622 and 624 and output layer 630, where W and b represent the weights and bias terms associated with each layer and node, respectively to arrive at the visual acuity 640.

Figure 7:
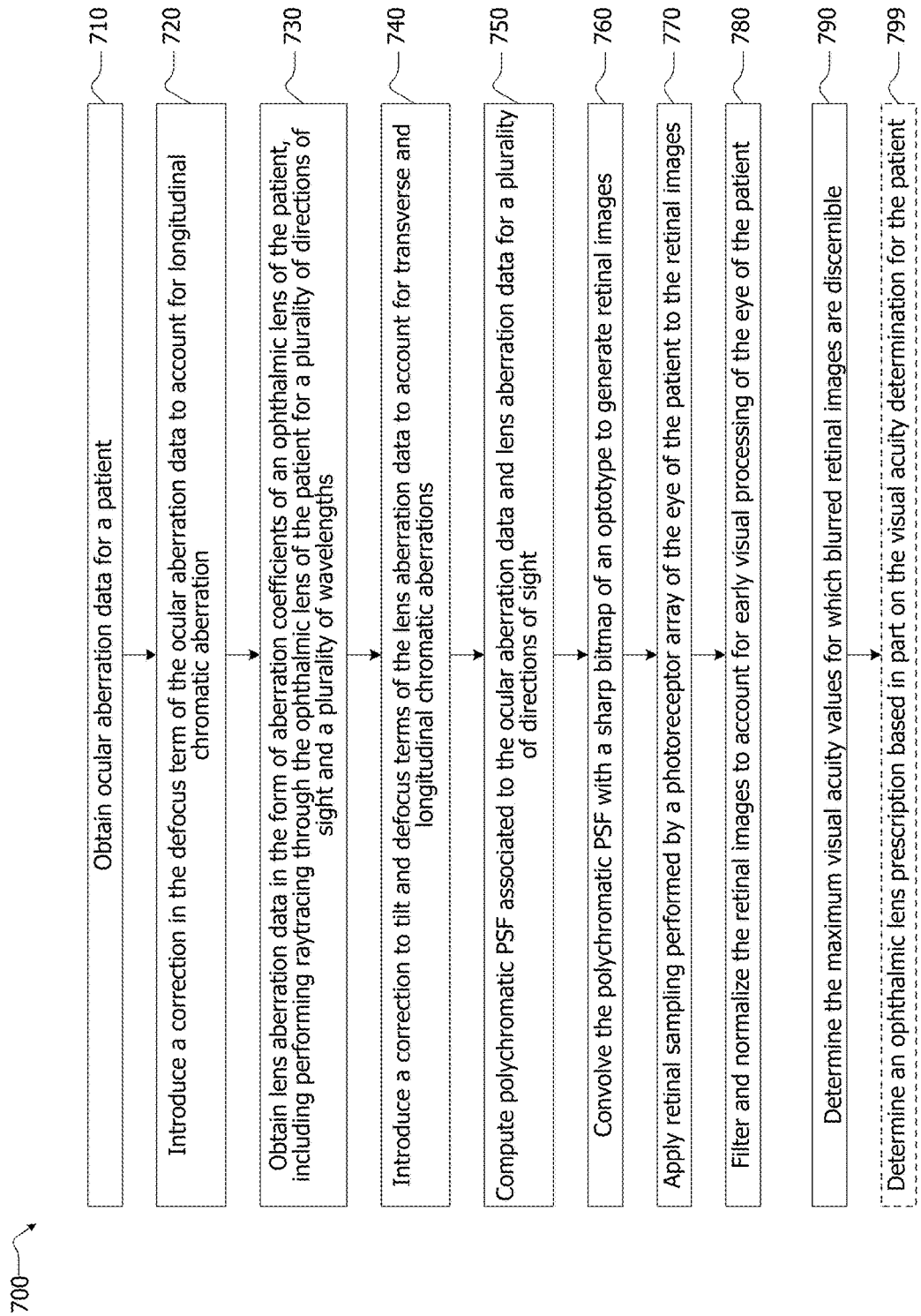
FIG. 7 is a flow chart of a streamlined, improved method for visual acuity calculation incorporating ocular and lens aberrations.

The above methods may be implemented, in one embodiment, in a simplified way to improve throughput and efficiency, making them usable in a clinical, patient-care setting. Referring to FIG. 7, a method 700 for deriving a visual acuity model from a combination of ocular aberrations and lens aberrations is provided. Ocular aberration data for a patient is obtained, as shown in block 710. This is achieved pursuant to block 110 described above. Correction in the defocus term of the ocular aberration data to account for longitudinal chromatic aberration is introduced, as shown in block 720. This is achieved according to the descriptions above regarding block 112. Lens aberration data in the form of aberration coefficients of an ophthalmic lens of the patient are obtained, including performing raytracing through the ophthalmic lens of the patient for a plurality of directions of sight and a plurality of wavelengths, as shown in block 730. The wavelengths are of spectral lines C, d and F. In one embodiment, the raytracing is performed through the lens of the patient and includes fitting Zernike polynomials to wavefronts emerging from the concave surface of the lens. This is discussed in more detail above regarding block 114 of FIG. 1.

Correction to tilt and defocus terms of the lens aberrations is introduced to account for transverse and longitudinal chromatic aberrations, as shown in block 740. A polychromatic PSF associated to the ocular aberration data and lens aberration data for a plurality of directions of sight is computed, as shown in block 750. The polychromatic PSF is convolved with a sharp bitmap of an optotype to generate retinal images, as shown in block 760. Retinal sampling by a photoreceptor array of the eye of the patient to the retinal images is performed, as shown in block 770. The retinal images are filtered and normalized to account for early visual processing of the eye of the patient, as shown in block 780. The maximum visual acuity values for which blurred retinal images are discernible are then determined, as shown in block 790. In one embodiment, the visual acuity determination is performed using an OCR engine to assess whether the optotypes in the retinal image are discernible. Ophthalmic lens parameters and/or an ophthalmic lens prescription based in part on the maximum visual acuity values may then be computed, as shown in block 799. An ophthalmic lens may be manufactured according to the ophthalmic lens parameters. The resulting ophthalmic lens will perform better and be more pleasing to the patient.

EXAMPLES

To evaluate the benefit of the neural network method versus the OCR method described above, example calculations were made. The visual acuity at distance vision of two patients, patients A and B, wearing progressive lenses were computed using the neural network method incorporating the statistical model and compared to calculations using the OCR method. The magnitude of the aberrations of each eye was randomly chosen based on statistical analyses of the most common aberrations. The aberrations of the lenses were computed for each direction of sight by performing the ray tracing procedure explained above. These aberrations, together with the pupil radius of the patients and standard parameters for the SCE (Stiles-Crawford effect), were used to calculate the visual acuity with both the OCR engine method and the neural network method.

The following table presents the characteristics of the lenses used in this evaluation for patient A and patient B.

|  | Lens A | Lens B |
| --- | --- | --- |
| Addition (D) | 2.50 | 2.50 |
| Sphere (D) | 1.00 | 1.00 |
| Cylinder (D) | −1.00 | −1.00 |
| Axis (D) | 20 | 0 |
| ZTilt (°) | 6 | 6 |
| Panto (°) | 15 | 15 |
| BVD (mm) | 14 | 14 |

The following table shows the pupil radius and aberrations for each patient A and B in the evaluation example.

|  | Eye A | Eye B |
| --- | --- | --- |
| Pupil radius (mm) | 1.6400 | 1.4497 |
| $c_3$ (μm) | −0.1788 | 0.0000 |
| $c_4$ (μm) | 0.1967 | 0.1537 |
| $c_5$ (μm) | 0.2130 | 0.2173 |
| $c_6$ (μm) | −0.0478 | −0.0313 |
| $c_7$ (μm) | 0.0085 | −0.0091 |
| $c_8$ (μm) | −0.0377 | 0.0181 |
| $c_9$ (μm) | −0.0211 | 0.0024 |
| $c_{10}$ (μm) | 0.0055 | −0.0151 |
| $c_{11}$ (μm) | −0.0126 | 0.0133 |
| $c_{12}$ (μm) | 0.0248 | −0.0070 |
| $c_{13}$ (μm) | 0.0038 | −0.0053 |
| $c_{14}$ (μm) | 0.0041 | −0.0007 |

Figure 8:
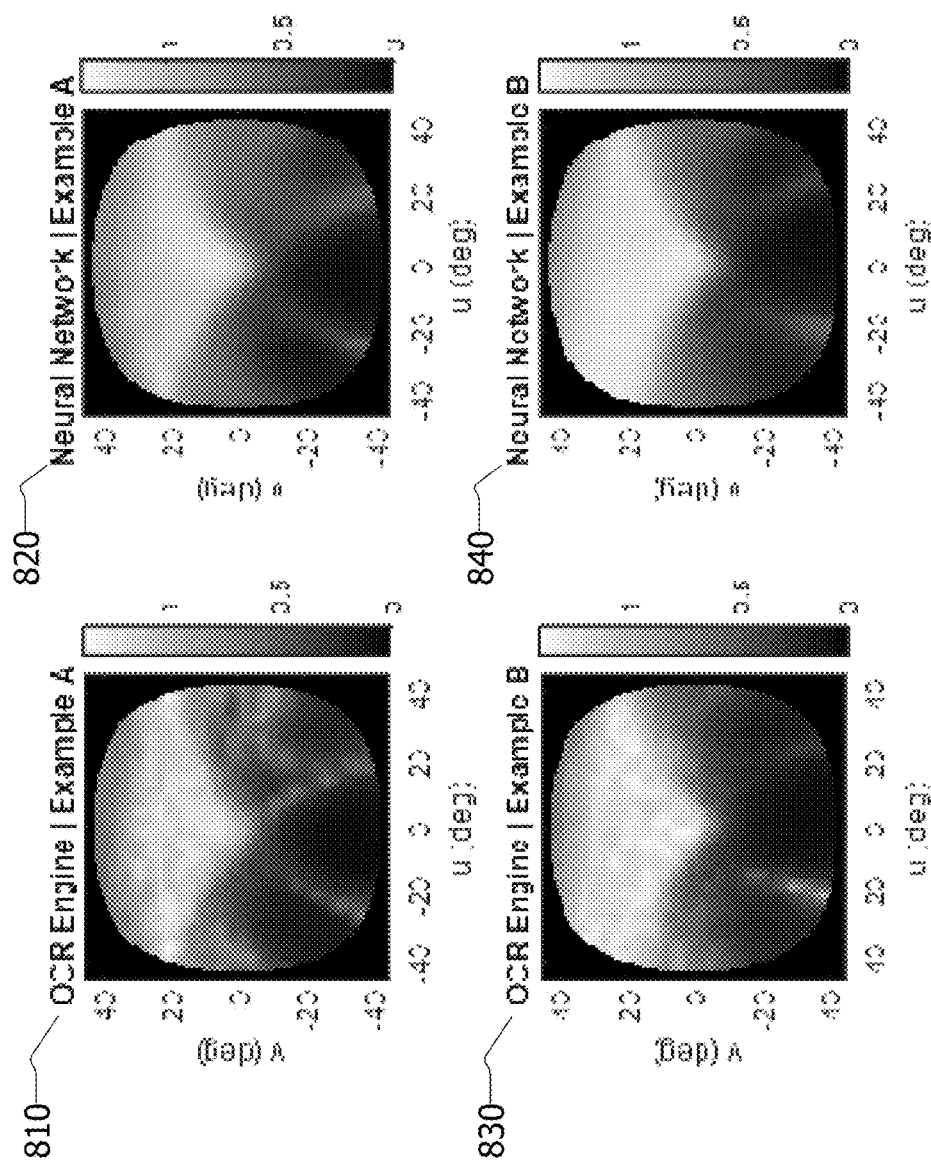
FIG. 8 shows four visual acuity maps of the results obtained using the methods described herein.

Referring now to FIG. 8, visual acuity maps obtained for each patient and lens combination with both procedures are shown. In both examples A and B there is agreement between the two methods of visual acuity computation. The visual acuity maps generated using the OCR method are shown in visual acuity maps 810 and 830. The visual acuity maps generated using the neural network shown as visual acuity maps 820 and 840 are smoother and preserve enough detail to accurately represent the visual acuity of each patient. Importantly, in terms of time efficiency, the difference between the two methods considered is striking. In this example, using the OCR method, calculation of 716 directions of sight that constitute each visual acuity map using the OCR engine took around 24 minutes using 13 calculation nodes. In stark contrast, the neural network method was able to compute each individual visual acuity map in mere milliseconds using a single calculation node.

Environment

Figure 9:
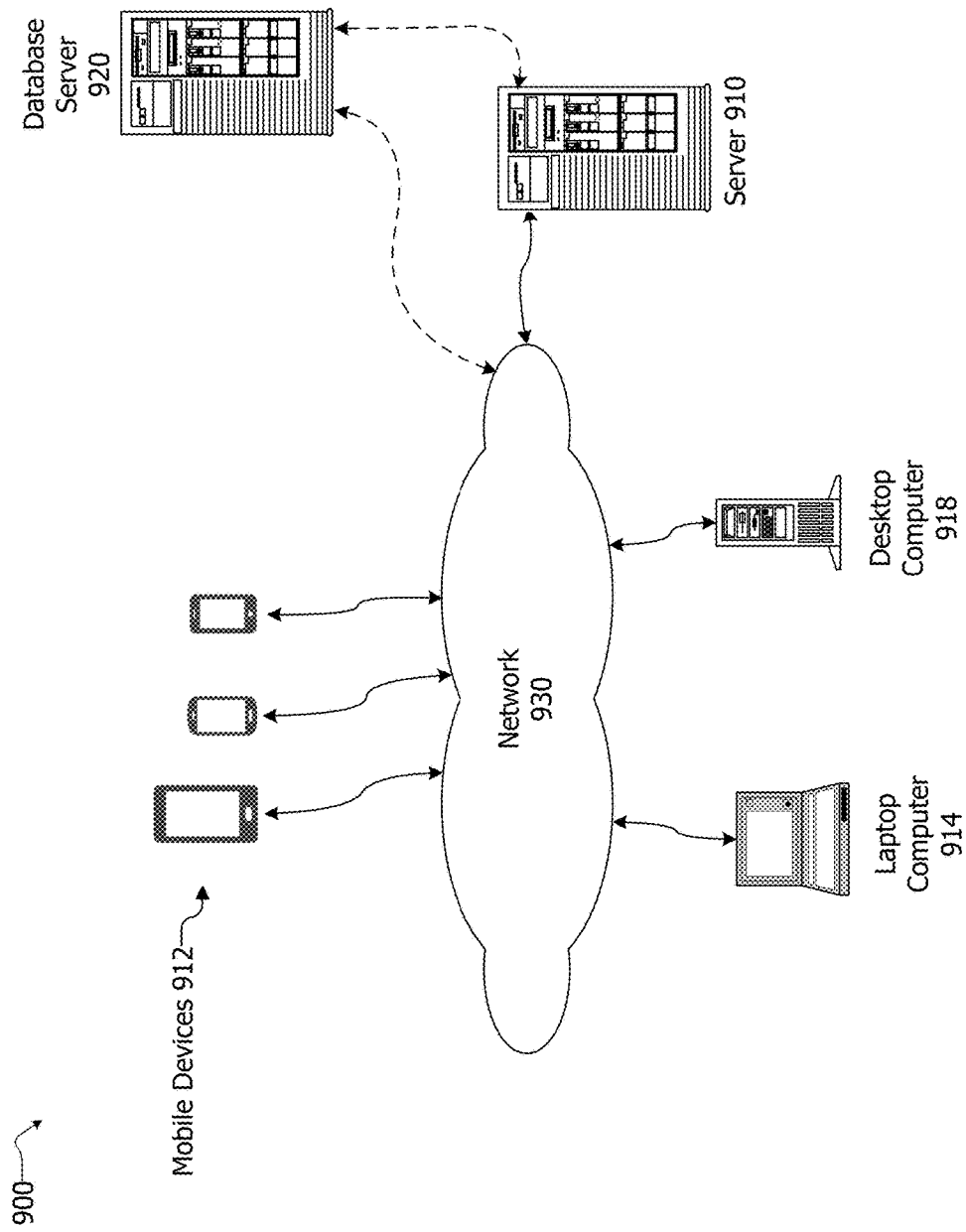
FIG. 9 is a drawing of a computing environment in which a portion of the methods described herein may be implemented.

FIG. 9 is a drawing of a computing environment 900 in which portions of the methods described herein may be implemented. Portions of the methods described herein, including the OCR engine and neural network, are implemented in software that is stored and executed in a computer or other computing device. A computing device as used herein refers to any device with a processor, memory and a storage device that executes instructions including, but not limited to, personal computers, desktop computers 918, server computers 910, mini-computers, mainframe computers, super computers, computer workstations, mobile devices 912 such as computing tablets and smartphones, portable computers, and laptop computers 914. These computing devices run an operating system, including, for example, variations of the Microsoft Windows, Linux, Android, Apple Mac and other operating systems.

The software is stored on a machine readable storage medium in a storage device included with or otherwise coupled or attached to a computing device. That is, the software is stored in electronic, machine readable media. These storage media include, for example, magnetic media such as hard disks; optical media such as compact disks (CD-ROM and CD-RW), digital versatile disks (DVD and DVD±RW), and BLU-RAY; silicon based storage including solid state drives (or silicon storage devices) (SSDs) and flash memory cards; and other magnetic, optical, and silicon storage media. As used herein, a storage device is a device that allows for reading and/or writing to a storage medium. Storage devices include hard disk drives, SSDs, DVD drives, flash memory devices, and others.

The computing device may include software for providing functionality and features described herein. The computing device may include one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). The components of the computing device may include specialized units, circuits, software and interfaces for providing the functionality and features described here.

The processes, functionality and features described herein are embodied in whole or in part in software which operates on a computing device and may be in the form of firmware, an application program, object code, executable code, an applet (e.g., a Java applet), a browser plug-in, a COM object, a dynamic linked library (DLL), a script, one or more subroutines, an operating system component or service, or a combination of these. The hardware and software and their functions may be distributed such that some components are performed by one computing device and others by other computing devices. The computing device may be or include or be coupled directly or over a network 930 with specialized computing devices and software such as database software and one or more database servers 920. The computing device may include network capable hardware and network software that allows the computing device to communicate by wired and/or wireless communications. The network 930 may be a local area network (LAN), wide area network (WAN), a combination of these, and may be or include the Internet.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A computing device comprising a processor, a memory and a storage medium, the storage medium storing a program having instructions which when executed by a processor cause the processor to perform operations comprising:
    obtaining ocular aberration data for a patient;
    introducing a correction in the defocus term of the ocular aberration data to account for longitudinal chromatic aberration;
    obtaining lens aberration data in the form of aberration coefficients of an ophthalmic lens of the patient, including performing raytracing through the ophthalmic lens of the patient for a plurality of directions of sight and a plurality of wavelengths;
    introducing a correction to tilt and defocus terms of the lens aberration data to account for transverse and longitudinal chromatic aberrations;
    computing polychromatic PSF associated to the ocular aberration data and lens aberration data for a plurality of directions of sight, wherein computing the polychromatic PSF includes computing a combination of the eye and lens aberrations for each of the wavelengths;
    convolving the polychromatic PSF with a sharp bitmap of an optotype to generate retinal images;
    applying retinal sampling performed by a photoreceptor array of the eye of the patient to the retinal images;
    filtering and normalizing the retinal images to account for early visual processing of the eye of the patient; and
    determining the maximum visual acuity values for which blurred retinal images are discernible.

2. The computing device of claim 1, wherein the raytracing is performed through the lens of the patient and includes fitting Zernike polynomials to wavefronts emerging from a concave surface of the lens.

3. The computing device of claim 1, wherein the wavelengths are of spectral lines C, d and F.

4. The computing device of claim 1, wherein determining the maximum visual acuity values is performed using an optical character recognition (OCR) engine to assess whether optotypes in the retinal image are discernible.

5. The computing device of claim 1 wherein the storage medium has further instructions stored thereon which when executed by the processor cause the computing device to generate ophthalmic lens parameters and/or an ophthalmic lens prescription based in part on the maximum visual acuity values.

6. The computing device of claim 1 wherein the storage medium has further instructions stored thereon which when executed by the processor cause the computing device to initiate manufacture of an ophthalmic lens according to the ophthalmic lens parameters.

7. The computing device of claim 1, wherein obtaining lens aberration data includes fitting Zernike or other polynomials to the wavefronts emerging from a concave surface of the lens.

8. The computing device of claim 1, wherein computing the polychromatic PSF includes computing the combination of the eye aberrations and lens aberrations for each of the wavelengths by subtracting Zernike coefficients of the ocular aberrations from lens aberrations, according to:

$$c_j(x_i,y_i,\lambda)=c_j^{lens}(x_i,y_i,\lambda)-c_j^{eye}(x_i,y_i,\lambda)$$

where $x_i$ and $y_i$ represent the x and y pupil plane coordinates of the i-th direction of sight, $c_j^{lens}(x_i, y_i, \lambda)$ and $c_j^{eye}(x_i, y_i, \lambda)$ are the lens and eye j-th aberration coefficients associated to i-th direction of sight and wavelength $\lambda$ and $c_j(x_i, y_i, \lambda)$ is their combination.

* * * * *